US006408187B1

(12) United States Patent
Merriam

(10) Patent No.: US 6,408,187 B1
(45) Date of Patent: Jun. 18, 2002

(54) METHOD AND APPARATUS FOR DETERMINING THE BEHAVIOR OF A COMMUNICATIONS DEVICE BASED UPON ENVIRONMENTAL CONDITIONS

(75) Inventor: Charles Merriam, Sunnyvale, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/312,318

(22) Filed: May 14, 1999

(51) Int. Cl.[7] ................................................. H04Q 7/20
(52) U.S. Cl. ........................ 455/458; 455/67.7; 455/567
(58) Field of Search ............................... 455/31.1, 31.2, 455/38.2, 38.4, 38.5, 575, 226.1, 226.2, 227, 67.1, 67.3, 67.7, 421, 458, 567; 340/870.09, 573.4, 582, 571, 506, 519, 540, 545.4

(56) References Cited

U.S. PATENT DOCUMENTS

| 4,603,325 | A | * | 7/1986 | Marino et al. ............... 340/539 |
| 4,871,997 | A | * | 10/1989 | Adriaenssens et al. ...... 340/539 |
| 5,357,560 | A | * | 10/1994 | Nykerk ........................ 379/59 |
| 5,448,567 | A | * | 9/1995 | Dighe et al. ................ 370/94.2 |
| 5,467,341 | A | * | 11/1995 | Matsukane et al. ........... 370/17 |
| 5,471,650 | A | * | 11/1995 | Vexler et al. ................. 455/69 |
| 5,546,411 | A | * | 8/1996 | Leitch et al. ................ 371/5.5 |
| 5,557,259 | A | * | 9/1996 | Musa .......................... 340/573 |
| 5,603,088 | A | * | 2/1997 | Gorday et al. .............. 455/53.1 |
| 5,809,414 | A | * | 9/1998 | Coverdale et al. .......... 455/421 |
| 5,810,201 | A | * | 9/1998 | Besse et al. ................... 222/39 |
| 5,892,447 | A | * | 4/1999 | Wilkinson ................ 340/573.4 |
| 5,963,131 | A | * | 10/1999 | D'Angelo et al. ........ 340/568.1 |
| 5,966,655 | A | * | 10/1999 | Hardouin .................... 455/418 |

* cited by examiner

Primary Examiner—William Trost
Assistant Examiner—Congvan Tran
(74) Attorney, Agent, or Firm—Hickman Palermo Truong & Becker, LLP; Bobby K. Truong

(57) ABSTRACT

A method and apparatus are disclosed for automatically determining the behavior of a communications device based upon the likelihood that a user is within relatively close proximity to the communications device. The apparatus comprises one or more sensors, one or more behavioral mechanisms, and a behavior determining mechanism. The sensors (which may, for example, be mechanical, audio, heat, or motion sensors) provide indications as to the likelihood that a user is within relatively close proximity to the communications device. These indications are received by the behavior determining mechanism, and in response, the behavior determining mechanism determines, based upon the indications, one or more appropriate behaviors for the apparatus. The behavior determining mechanism then causes one or more of the behavioral mechanisms to carry out the appropriate behaviors. By taking into account the likelihood that a user is within relatively close proximity to the communications device, the apparatus of the present invention enables the communications device to adapt its behavior to conform to its immediate environment. Thus, for example, if a communications device is situated in a room in which a meeting is being conducted, it will not issue an audio alert in response to an incoming communication. Instead, it will issue an alternate alert, such as a visual alert or a vibrating alert, to avoid disrupting the meeting. This and many other applications are possible with the present invention.

27 Claims, 3 Drawing Sheets

| SENSOR/STATUS | BEHAVIOR |
| --- | --- |
| MECHANICAL SENSOR (AFFIRMATIVE) | VIBRATE; FORWARD |
| MECHANICAL SENSOR (NEGATIVE) | VISUAL ALERT; AUDIO ALERT |
| AUDIO SENSOR (AFFIRMATIVE) | VIBRATE; VISUAL ALERT |
| AUDIO SENSOR (NEGATIVE) | AUDIO ALERT; FORWARD |
| MOTION SENSOR (AFFIRMATIVE) | VIBRATE; VISUAL ALERT |
| MOTION SENSOR (NEGATIVE) | AUDIO ALERT; FORWARD |
| HEAT SENSOR (AFFIRMATIVE) | VIBRATE; VISUAL ALERT |
| HEAT SENSOR (NEGATIVE) | AUDIO ALERT; FORWARD |
| AUDIO SENSOR (AFFIRMATIVE) & MOTION SENSOR (AFFIRMATIVE) | VIBRATE; VISUAL ALERT; FORWARD |
| AUDIO SENSOR (AFFIRMATIVE) & MOTION SENSOR (NEGATIVE) | VIBRATE; VISUAL ALERT; AUDIO ALERT; FORWARD |
| ... | ... |

Fig. 2

METHOD AND APPARATUS FOR DETERMINING THE BEHAVIOR OF A COMMUNICATIONS DEVICE BASED UPON ENVIRONMENTAL CONDITIONS

BACKGROUND

This invention relates generally to communications systems and more particularly to a method and apparatus for determining the behavior of a communications device based upon the current proximity of a user to the device.

Due to improved technology, lower cost, and larger service areas, the use of portable communications devices, such as mobile telephones and pagers, has greatly proliferated in recent years. One of the factors that has contributed to the popularity of portable communications devices has been the freedom that they afford their users. With portable communications devices, people are no longer required to stay in particular locations to wait for important phone calls. Rather, they are free to conduct their lives and their business as usual, knowing that they can almost always be reached by way of their portable devices. With mobile phones and pagers, busy executives are able to conduct business even when they are in their cars, in a plane, etc., and field personnel are able to work in the field without being "out of touch" with the home office.

While portable communications devices do offer significant mobility advantages, they do not come without their drawbacks. One of the drawbacks is that of untimely interruption and disruption. For example, it is not an unusual occurrence for a mobile phone or a pager to ring or beep during an important meeting. When this happens, it disrupts the flow of the meeting and, in many instances, annoys the participants of the meeting. If several of the participants have portable communications devices (which is not uncommon), and if each device rings or beeps even once, the flow and the effectiveness of the meeting can be significantly disrupted and even undermined.

Some device manufacturers have tried to alleviate this problem by providing a vibrating mechanism with their devices which allows the devices to alert a user of an incoming communication by vibrating instead of ringing or beeping. While this mechanism does minimize the disruption caused by audio alerts, it is effective only if the user remembers to invoke it prior to the meeting. If the user forgets to invoke vibrating mode, then the audio alert of the portable device will sound and disrupt the meeting in the same manner as before. Hence, vibrating mode in and of itself is not an adequate solution. What is needed instead is a mechanism that automatically determines, based upon certain factors, how a communications device should behave at any particular time. Such a mechanism is not believed to be currently available.

SUMMARY OF THE INVENTION

The present invention is based, at least partially, upon the observation that much of the proper behavior of a communications device can be determined based upon whether a user is within relatively close proximity to the device. For example, if a communications device is attached to the belt of a user and hence is within close proximity to the user, then there is no need for the device to produce an audio alert when an incoming communication is received. Instead, a vibration or a visual alert (e.g. a flashing light or a display) will suffice. On the other hand, if the user is not close to the device, then an audio alert or another action (such as forwarding the communication to another device) may be appropriate. As this discussion shows, the proximity of a user to the communications device is often determinative of the proper behavior of the device. Based upon this observation, the present invention provides a mechanism for automatically determining the behavior of a communications device based upon the likelihood that a user is within relatively close proximity to the communications device.

According to one embodiment, an apparatus of the present invention comprises one or more sensors, one or more behavioral mechanisms, and a behavior determining mechanism. Each sensor (which may, for example, be a mechanical, audio, heat, or motion sensor) monitors the environment surrounding the communications device and provides an indication as to the likelihood that a user is within relatively close proximity to the communications device. For purposes of the present invention, a sensor is required to provide only an indication of likelihood that a user is within relatively close proximity to the communications device; it need not make an absolute determination as to the presence of a user. This indication of likelihood is used by the behavior determining mechanism to determine the behavior of the communications device.

More specifically, the behavior determining mechanism receives the indications from the sensors and, based upon the indications, determines one or more appropriate behaviors for the communications device. In one embodiment, this determination is made by consulting a behavioral table which sets forth the behaviors of the communications device under specific indications conditions. The values in the behavioral table can be specified by a user. This allows the user to customize the behavior of the communications device.

Once the one or more appropriate behaviors for the communications device have been determined, the behavior determining mechanism causes the one or more behavioral mechanisms to carry out the appropriate behaviors. This may, for example, involve activating a vibrating alert mechanism to cause the communications device to vibrate, or activating a visual alert mechanism to cause a message to be displayed or a light to flash, or activating a communication forwarding mechanism to cause a communication to be forwarded to another communications device, or causing an audio alert mechanism to activate or not activate. These and many other behaviors and behavioral mechanisms are possible. Which behaviors are carried out will depend upon the likelihood that a user is within relatively close proximity to the communications device. By taking user proximity into account, the present invention enables the communications device to automatically adapt its behavior to conform to its immediate environment.

BRIEF DESCRIPTION OF THE DRAWINGS

FIG. 2 illustrates a table in which behavioral determining information is stored in accordance with one embodiment of the present invention.

DETAILED DESCRIPTION OF THE EMBODIMENT(s)

Figure 1:
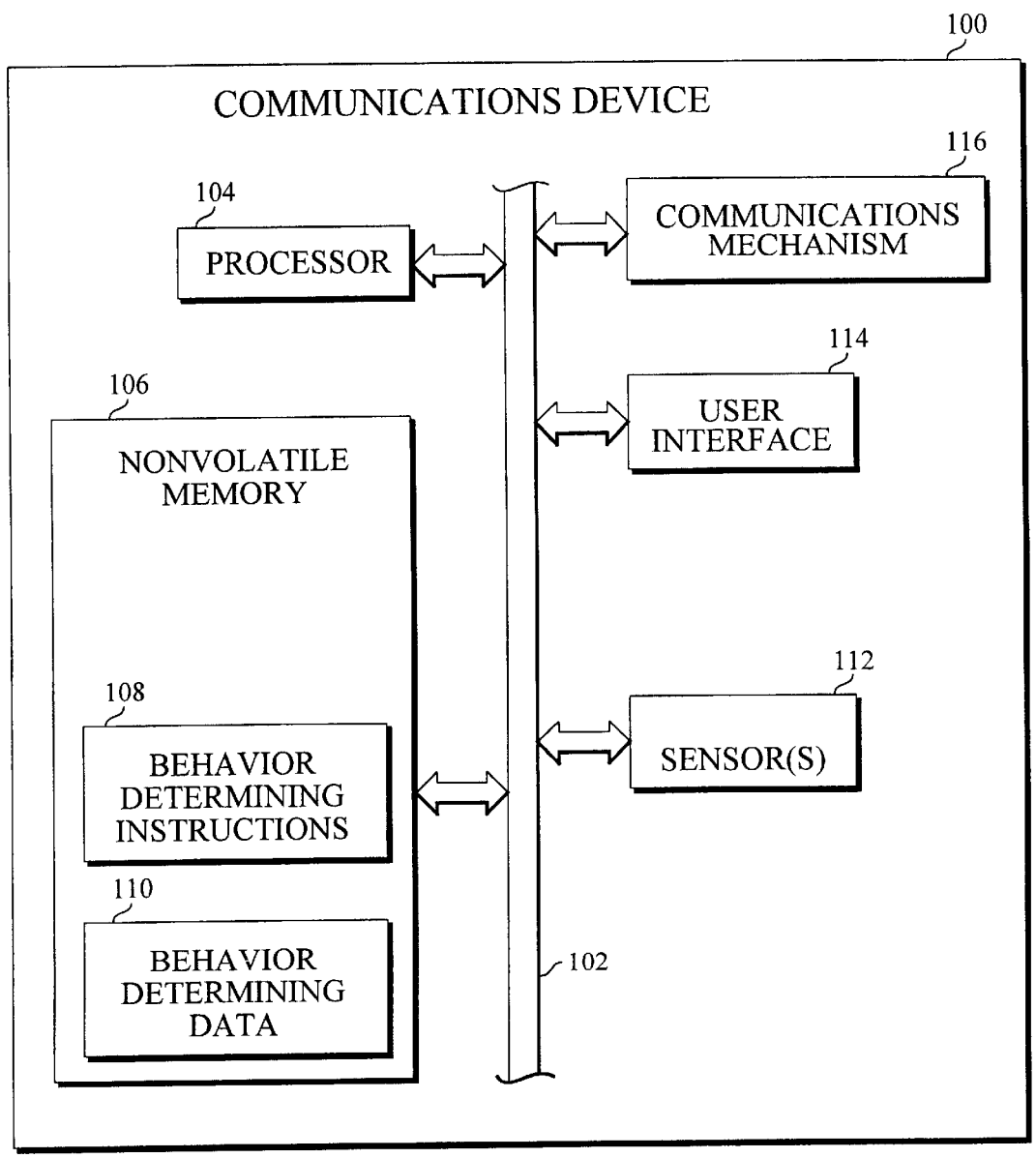
FIG. 1 is a block diagram representation of a communications device wherein one embodiment of the present invention is implemented.

With reference to FIG. 1, there is shown a communications device 100 in which one embodiment of the present invention is implemented. For purposes of the present invention, communications device 100 may be any device capable of sending and/or receiving communications and/or information, including but not limited to, a telephone (mobile or land line), a pager, an electronic mail enabled device, a facsimile machine, a computer (portable or non-portable), and audio/video conferencing equipment.

Communications device 100 comprises a main bus 102 and a plurality of components coupled to the main bus 102, including a processor 104 and a non-volatile memory 106. Non-volatile memory 106 contains therein a set of behavior determining instructions 108 which are executed by the processor 104 to carry out the methodology of the present invention, and a set of behavior determining data 110. As explained further below, the data 110 is user specifiable, and is used to determine the appropriate behavior for the communications device 100. Together, the processor 104 and the instructions 108 form a behavior determining mechanism. In this embodiment, the functionality of the invention is derived from the processor 104 executing the program instructions 108; however, it should be noted that the invention is not so limited. If so desired, the functionality of the present invention may be achieved by way of hardwired logic components. This and other modifications are within the scope of the invention.

Communications device 100 further comprises one or more sensors 112 coupled to the main bus 102. The purpose of the sensors 112 is to monitor the environment surrounding the communications device 100 and to provide indications as to the likelihood that a user is currently within relatively close proximity to the device 100. These indications allow the behavior determining mechanism (the processor 104 executing the instructions 108) to determine the likelihood that a user is actually within relatively close proximity to the device 100, and to determine the behavior of the device 100 accordingly.

According to the present invention, a sensor 112 may be any of a number of different mechanisms. For example, sensor 112 may be a mechanical sensor such as a button on a belt clip which is depressed when the communications device 100 is not clipped to a belt, and released when the communications device 100 is clipped to a belt. When the button is released, thereby indicating that the device 100 is clipped to a belt, and hence indicating a likelihood that the device 100 is within relatively close proximity to a user, the mechanical sensor 112 provides an affirmative indication of likelihood. On the other hand, if the button is depressed, then the mechanical sensor 112 provides a negative indication of likelihood.

The sensor 112 may also be an audio sensor which senses audio signals (voices, noise, sounds, etc.) around the communications device 100. If audio signals of sufficient strength are detected, then there is a likelihood that a user is within relatively close proximity to the communications device 100. Hence, the audio sensor provides an affirmative indication of likelihood. On the other hand, if no audio signals or very low-strength audio signals are detected, then the audio sensor 112 provides a negative indication of likelihood.

The sensor 112 may also be a heat sensor for detecting the body heat of a nearby user. If sufficient body heat is detected, thereby indicating a likelihood that a user is within relatively close proximity to the communications device 100, then the heat sensor 112 provides an affirmative indication of likelihood. Otherwise, the heat sensor 112 provides a negative indication of likelihood.

In addition, the sensor 112 may be a motion sensor for detecting motion around the vicinity of the communications device 100. If motion is sensed, thereby indicating a likelihood that a user is within relatively close proximity to the device 100, then the motion sensor 112 outputs an affirmative indication of likelihood. If no motion is sensed, then the motion sensor 112 outputs a negative indication of likelihood.

Further, the sensor 112 may be a proximity sensor, such as an infrared based sensor, for detecting whether an object is within a certain distance of the sensor 112. If so, then there is a likelihood that a user is within relatively close proximity to the device 100. In such a case, the proximity sensor 112 outputs an affirmative indication of likelihood. If not, then the proximity sensor 112 outputs a negative indication of likelihood.

The above are just some of the possible embodiments of the sensor 112. Many more are possible. For purposes of the present invention, any sensing mechanism that is capable of providing an indication as to the likelihood that a user is within relatively close proximity to the communications device 100 can be used as the sensor 112. A point to note regarding the sensors 112 is that, in the present invention, they are not required to make an absolute determination as to the presence of a user. Rather, they need to provide only an indication of likelihood that a user is within relatively close proximity to the communications device. Because the sensors 112 deal with likelihood, and hence probabilities, there is a potential for error (i.e. the sensors may provide an affirmative indication of likelihood even when no user is within close proximity to the communications device). To lessen the possibility for error, multiple types of sensors 112 (e.g. an audio sensor and a motion sensor) may be used to check for multiple indicia of a user's presence. This is within the scope of the present invention.

In addition to the sensors 112, communications device 100 further comprises a user interface 114, and a communications mechanism 116, both of which are coupled to the main bus 102. The user interface 114 comprises all components necessary for receiving input from and providing output to the user, including for example a microphone, a speaker, and a keypad. The interface 114 further comprises mechanisms for alerting users of incoming communications, including an audio alert mechanism (e.g. a ringer), a vibrating mechanism, and a visual alert mechanism (e.g. a display or a blinking or flashing light). As described further below, these mechanisms may be invoked as behavioral mechanisms to carry out appropriate behaviors for the communications device 100. As to the communications mechanism 116, it comprises all components necessary for communicating with other entities (such as base stations and other communications devices) including a transmitting mechanism and a receiving mechanism. As described further below, mechanism 116 may also be invoked as a behavioral mechanism to carry out appropriate behaviors for device 100. In addition to user interface 114 and communications mechanism 116, device 100 may further comprise other behavioral mechanisms, each mechanism imparting a certain behavior to the communications device 100. Such other behavioral mechanisms are within the scope of the present invention.

As mentioned previously, the particular behavior or behaviors carried out by the communications device 100 is determined by the behavior determining data 110 stored in the non-volatile memory 106. According to one embodiment, data 110 is freely specifiable by a user. By making data 110 user specifiable, the present invention enables a user to customize the behavior of the communications device 100. This aspect of the invention will be described in greater detail in a later section.

With reference to FIG. 2, there is shown one embodiment of the behavior determining data 110, wherein the data takes the form of a behavioral table 110 having two columns: (1) a sensor/status column; and (2) a behavior column. In each row of the behavioral table 110, there is stored an identification of a particular sensor (e.g. the mechanical sensor) and an indication status associated with that sensor (e.g. affirmative or negative), and one or more behaviors. This information specifies how the communications device 100 should behave in response to specific indications of likelihood from specific sensors.

For example, if an audio sensor detects strong audio signals around the communications device 100 and hence, outputs an affirmative indication of likelihood, then in response to a particular event, such as an incoming communication, the communications device 100 should, according to table 110, first vibrate to alert the user, and then if the user does not respond within a certain period of time, to activate a visual alert. No audio alert is sounded. On the other hand, if the audio sensor detects no audio signals around the communications device and hence, outputs a negative indication of likelihood, then the communications device 100 should, according to table 110, respond to a particular event such as an incoming communication by first sounding an audio alert, and then if the user does not respond within a certain period of time, forwarding the communication to another device. In this manner, the behavioral table 110 enables the communications device 100 to adapt its behavior, based upon the likelihood that a user is within relatively close proximity to the device 100, to conform to its immediate environment.

As an enhancement, the information in the sensor/status column may contain the identification and status indication for multiple sensors. For example, as shown in the ninth row of table 110, the table 110 may specify that if both the audio sensor and the motion sensor output affirmative indications of likelihood, then the proper behavior for the communications device 100 should be to vibrate first, then to activate a visual alert, and then to forward a communication. The advantage of including multiple sensors/status information in the same row is that it allows the communications device 100 to take multiple types of sensors into account in determining the appropriate behavior for the device 100. As mentioned previously, the more types of sensors that are taken into account, the greater the chance of making a correct determination as to whether a user is actually within close proximity to the communications device 100. This is within the scope of the present invention.

Figure 3:
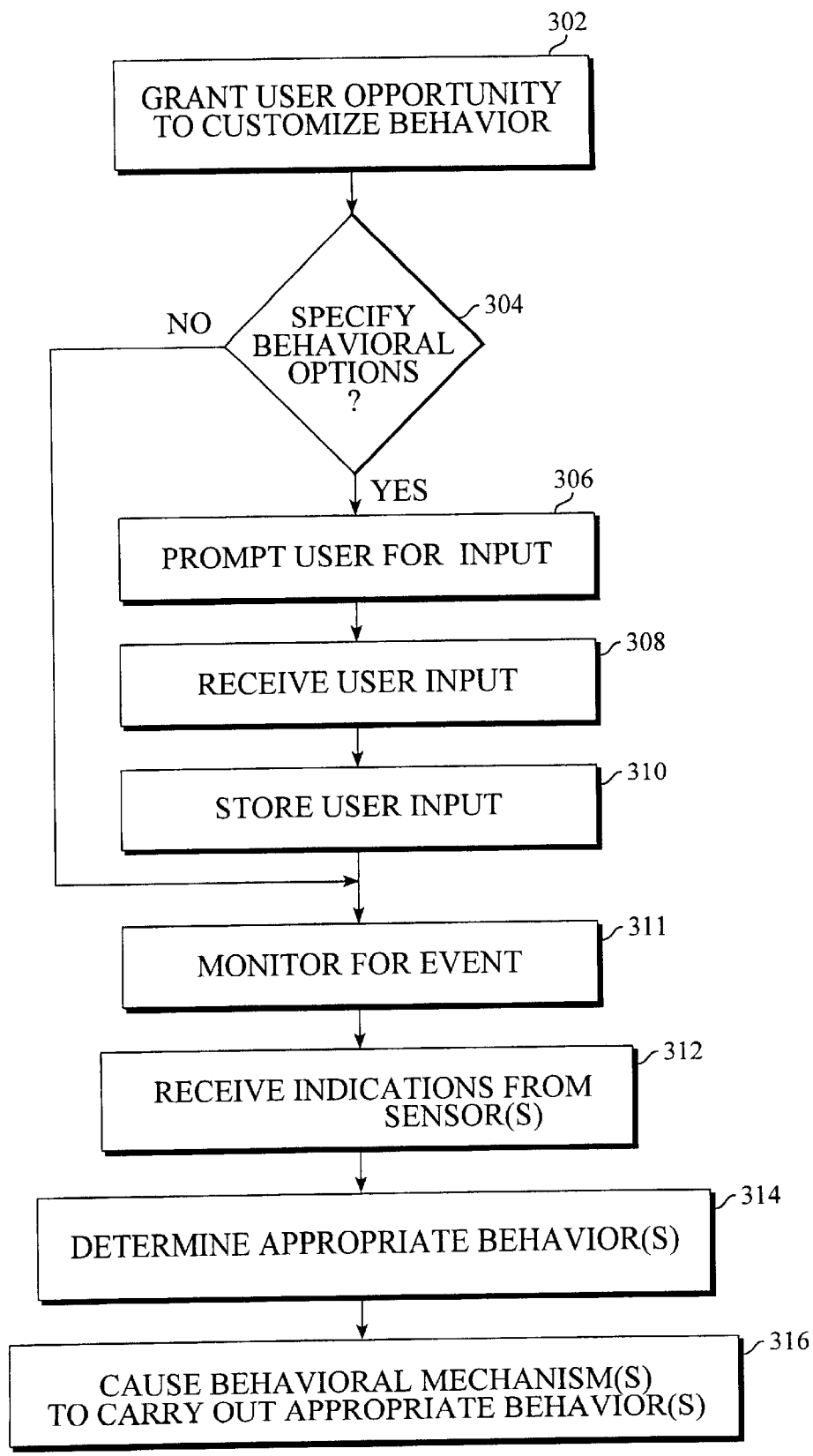
FIG. 3 is a flow diagram illustrating the operation of the present invention.

With reference to the flow diagram of FIG. 3, the operation of the apparatus of the present invention will now be described. Under direction of the behavior determining instructions 108 stored in volatile memory 106, the processor 104 begins operation by granting (302) the user an opportunity to initialize or update the behavioral table 110. This gives the user the opportunity to customize the behavior of the communications device 100. If the user indicates that he does not wish to update the behavioral table 110, then processor 104 proceeds to (311). Otherwise, processor 104 proceeds to (306).

Processor 104 begins the update process by prompting (306) the user for input. This is carried out by first displaying to the user via the user interface 114 an identification of a sensor 112 available in the communications device 100 and a possible indication status for that sensor (e.g. mechanical sensor (affirmative)), and then providing the user a list of choices for possible behaviors (e.g. vibrate, audio alert, visual alert, forward). This in effects asks the user what the user would like the communications device 100 to do if that particular sensor produces that particular indication of likelihood. In response, the user selects via the user interface 114 one or more of the choices of possible behaviors. This user input is received (308) by the processor 104 and stored (310) into the behavioral table 110 in the non-volatile memory 106. In this manner, one of the rows of the behavioral table 110 is updated. Processor 104 repeats (306), (308), and (310) until the user has specified behaviors for all possible indications conditions (i.e. for all sensors in the communications device 100 and all possible status indications for the sensors). If multiple types of sensors are taken into account as is the case with the ninth and tenth entries in the table 110 of FIG. 2, then behaviors will need to be specified for combinations of sensors and sensor status indications. The behavioral table 110 is thus populated.

Thereafter, processor 104 proceeds to (311) to monitor for the occurrence of a particular event, such as the reception of an incoming communication. When such an event is detected, processor 104 receives (312) indications of likelihood from the various sensors in the communications device. These indications of likelihood provide to the processor 104 a sense of the likelihood that a user is within relatively close proximity to the communications device 100. Using these indications, processor 104 consults the behavioral table 110 to determine (314) the appropriate behavior or behaviors for the communications device 100.

Once the appropriate behaviors have been determined, processor 104 causes (316) the appropriate behavioral mechanisms to carry out the appropriate behaviors. This may involve, for example: (1) activating the vibrating mechanism in the user interface 114 to cause the communications device 100 to vibrate; (2) activating the visual alert mechanism in the user interface 114 to cause a message to be displayed or a light to flash; (3) activating or not activating the audio alert mechanism in the user interface 114; or (4) activating the communications mechanism 116 to contact a base station to instruct the base station to forward the incoming communication to another communications device. These and other behaviors are within the scope of the present invention.

In the manner described, the apparatus of the present invention effectively adjusts the behavior of the communications device 100 based upon whether a user is likely to be within relatively close proximity to the device 100. By doing so, the present invention enables the device 100 to automatically adapt its behavior to conform to its immediate environment. Thus, for example, if the communications device 100 is situated in a room in which a meeting is being conducted, then the device 100 will not ring in response to an incoming communication. Instead, it will use a less disruptive alerting mechanism, such as a vibrating mechanism or a visual alert mechanism. As a result, the meeting is not disrupted. This is just one of the advantageous uses of the present invention. There are many others. These other uses will be clear to those of ordinary skill in the art with the benefit of this disclosure.

Thus far, the present invention has been described with an emphasis towards determining whether a user is within relatively close proximity to the communications device. While this is an advantageous implementation of the concept of the invention, it should be noted that the invention may be applied more broadly. Specifically, the present invention may be generalized to automatically adjusting the behavior of a communications device based upon the surrounding environment in which the communications device is situated. This may take into account more factors than just whether a user is within close proximity to the communications device. As an example, the present invention may be used to automatically adjust the volume of a ringer based upon the environment surrounding the communications device. For example, if an audio sensor senses a high amount of noise around the communications device, then the behavior determining mechanism 108 may increase the volume of a ringer to enable the ringer to be heard over the noise. As a further example, if a proximity sensor senses that the communications device is in a confined space (such as a purse), then the behavior determining mechanism 108 may increase the volume of the ringer to enable the ringer to be heard despite the fact that the communications device is in a purse. Neither of these factors are closely related to whether a user is within close proximity to the communications device. As this discussion shows, the present invention is quite general. It may be applied to any situation in which it is desirable to adjust the behavior of a communications device based upon the environment in which the device is currently situated. All such applications are within the scope of the present invention.

At this point, it should be noted that although the invention has been described with reference to specific embodiments, it should not be construed to be so limited. Various modifications can be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method implemented by a communications device for alerting a user of the communications device to an incoming communication, comprising:

receiving an incoming communication intended for the user of the communications device;

determining one or more environmental conditions of a current environment surrounding the communications device;

selecting, based upon said environmental conditions, one or more appropriate mechanisms, from a plurality of alert mechanisms, to invoke to alert the user of said incoming communication; and alerting the user by invoking said one or more appropriate mechanisms.

2. The method of claim 1, wherein said incoming communication comprises one of the members of a group consisting of: a telephone call, a page, an audio transmission, a video transmission, a data transmission, and a text message.

3. The method of claim 1, wherein said environmental conditions comprise one or more of the members of a group consisting of: amount of noise around the communications device, amount of body heat near the communications device, motion around the communications device, whether there are objects within close proximity to the communications device, and whether the user is in physical contact with the communications device.

4. The method of claim 1, wherein determining comprises:

receiving information from at least one environmental sensor.

5. The method of claim 4, wherein determining comprises:

receiving information from a plurality of environmental sensors.

6. The method of claim 1, wherein alerting comprises:

invoking a plurality of said appropriate mechanisms.

7. The method of claim 1, wherein:

determining comprises:
  determining whether the communications device is in physical contact with the user;

selecting comprises:
  selecting a mechanical alert mechanism if the communications device is in physical contact with the user; and alerting comprises:
  invoking said mechanical alert mechanism.

8. The method of claim 7, wherein said mechanical alert mechanism comprises a vibration mechanism.

9. The method of claim 1, wherein:

determining comprises:
  determining a noise level for said current environment;

selecting comprises:
  selecting a mechanical alert mechanism if said noise level exceeds a certain threshold; and alerting comprises:
  invoking said mechanical alert mechanism.

10. The method of claim 1, wherein:

determining comprises:
  determining a noise level for said current environment;

selecting comprises:
  selecting a visual alert mechanism if said noise level exceeds a certain threshold; and alerting comprises:
  invoking said visual alert mechanism.

11. The method of claim 1, wherein:

determining comprises:
  determining an amount of body heat in said current environment;

selecting comprises:
  selecting a mechanical alert mechanism if said amount of body heat exceeds a certain threshold; and alerting comprises:
  invoking said mechanical alert mechanism.

12. The method of claim 1, wherein:

determining comprises:
  determining there is motion in said current environment;

selecting comprises:
  selecting a mechanical alert mechanism if there is motion in said current environment; and alerting comprises:
  invoking said mechanical alert mechanism.

13. The method of claim 1, wherein:

determining comprises:
  determining there is motion in said current environment;

selecting comprises:
  selecting a visual alert mechanism if there is motion in said current environment; and alerting comprises:
  invoking said visual alert mechanism.

14. The method of claim 1, wherein:

determining comprises:
  determining whether said current environment is a confined space;

selecting comprises:
selecting an audio alert mechanism if said current environment is a confined space; and
alerting comprises:
invoking said audio alert mechanism at a higher than average volume.

15. The method of claim 1, further comprising:
determining whether the user has received said incoming communication; and
forwarding said incoming communication to another communications device if the user has not received said incoming communication.

16. A communications device, comprising:
a communications mechanism for receiving an incoming communication intended for a user of said communications device;
one or more sensors, each sensor providing an indication of one or more environmental conditions of a current environment surrounding said communications device;
a plurality of alert mechanisms for alerting the user to said incoming communication; and
a behavioral determining mechanism coupled to said one or more sensors and said plurality of alert mechanisms, said behavior determining mechanism selecting, based upon said one or more environmental conditions, one or more of said plurality of alert mechanisms as being appropriate mechanisms for alerting the user to said incoming communication, and invoking said appropriate mechanisms.

17. The communications device of claim 16, wherein said incoming communication comprises one of the members of a group consisting of: a telephone call, a page, an audio transmission, a video transmission, a data transmission, and a text message.

18. The communications device of claim 16, wherein said environmental conditions comprise one or more of the members of a group consisting of: amount of noise around the communications device, amount of body heat near the communications device, motion around the communications device, whether there are objects within close proximity to the communications device, and whether the user is in physical contact with the communications device.

19. The communications device of claim 16, wherein said communications device comprises a plurality of sensors, with each sensor providing an indication of a different environmental condition.

20. The communications device of claim 16, wherein said one or more sensors comprises a mechanical sensor for sensing whether said communications device is in physical contact with the user, wherein said plurality of alert mechanisms comprises a mechanical alert mechanism, and wherein said behavior determining mechanism selects and invokes said mechanical alert mechanism if said mechanical sensor indicates that said communications device is in physical contact with the user.

21. The communications device of claim 16, wherein said one or more sensors comprises an audio sensor for sensing a noise level for said current environment, wherein said plurality of alert mechanisms comprises a mechanical alert mechanism, and wherein said behavior determining mechanism selects and invokes said mechanical alert mechanism if said audio sensor indicates that said noise level exceeds a certain threshold.

22. The communications device of claim 16, wherein said one or more sensors comprises an audio sensor for sensing a noise level for said current environment, wherein said plurality of alert mechanisms comprises a visual alert mechanism, and wherein said behavior determining mechanism selects and invokes said visual alert mechanism if said audio sensor indicates that said noise level exceeds a certain threshold.

23. The communications device of claim 16, wherein said one or more sensors comprises a heat sensor for sensing body heat in said current environment, wherein said plurality of alert mechanisms comprises a mechanical alert mechanism, and wherein said behavior determining mechanism selects and invokes said mechanical alert mechanism if said heat sensor indicates that said body heat exceeds a certain threshold.

24. The communications device of claim 16, wherein said one or more sensors comprises a motion sensor for sensing motion in said current environment, wherein said plurality of alert mechanisms comprises a mechanical alert mechanism, and wherein said behavior determining mechanism selects and invokes said mechanical alert mechanism if said motion sensor indicates that there is motion in said current environment.

25. The communications device of claim 16, wherein said one or more sensors comprises a motion sensor for sensing motion in said current environment, wherein said plurality of alert mechanisms comprises a visual alert mechanism, and wherein said behavior determining mechanism selects and invokes said visual alert mechanism if said motion sensor indicates that there is motion in said current environment.

26. The communications device of claim 16, wherein said one or more sensors comprises a proximity sensor for sensing whether said current environment is a confined space, wherein said plurality of alert mechanisms comprises an audio alert mechanism, and wherein said behavior determining mechanism selects and invokes said audio alert mechanism at a higher than average volume if said proximity sensor indicates that said current environment is a confined space.

27. The communications device of claim 16, wherein said behavior determining mechanism determines whether the user has received said incoming communication, and if not, said behavior determining mechanism causing said communications mechanism to forward said incoming communication to another communications device.

* * * * *